United States Patent [19]
Skaggs

[11] 3,780,414
[45] Dec. 25, 1973

[54] AUTOMATED CONVEYOR SYSTEM

[75] Inventor: Richard Skaggs, Columbus, Miss.

[73] Assignee: The Raymond Lee Organization, Inc., New York, N.Y. ; a part interest

[22] Filed: Apr. 5, 1972

[21] Appl. No.: 241,370

[52] U.S. Cl. ............................... 29/200 A, 29/200 P
[51] Int. Cl. ............................................. B23p 19/00
[58] Field of Search ..................... 29/200 A, 200 R, 29/200 P, 208 R; 83/284; 72/184

[56] References Cited
UNITED STATES PATENTS
R25,886  10/1965  Cargill ............................. 29/200 A

*Primary Examiner*—Thomas H. Eager
*Attorney*—Howard I. Podell

[57] ABSTRACT

An automated conveyor system, in which the product is carried by one continuous conveyor, and the machinery for processing the product is carried by additional continuous conveyors. A segment of each machinery conveyor parallels and is directly above a segment of the product conveyor, with the direction of rotation of each continuous product conveyor being opposite to the direction of rotation of the continuous machinery conveyor. The speeds of all conveyors are so adjusted that at those locations where a machinery conveyor is parallel to, and above the product conveyor, both conveyors are aligned together, move at the same speed and in the same direction, so that machinery can perform machining functions on the product being carried by the product conveyor.

5 Claims, 3 Drawing Figures

3,780,414

AUTOMATED CONVEYOR SYSTEM

SUMMARY OF THE INVENTION

This invention relates to a means for machine processing of products which are carried on a conveyor, with the processing equipment carried on additional conveyors.

In my invention, sections of the conveyor containing processing machinery are parallel to, and above the product conveyor with both product and processing machinery conveyors moving at the same speed and in the same direction in the area of overlap, so that the product is stationary with respect to the processing machinery.

Means are provided for the insertion of the product onto a continuous product conveyor. The machinery remains permanently fastened to the continuous processing conveyor.

The product conveyor may consist of separate coupled sections insulated with a coating or lined with non-abrasive material so as to protect the surface finish of the product being conveyed.

DESCRIPTION OF THE DRAWING

The objects and features of the invention may be understood with reference to the following detailed description of an illustrative embodiment of the invention taken together with the accompanying drawing in which.

DESCRIPTION OF THE PREFERRED EMBODIMENT

Figure 1:
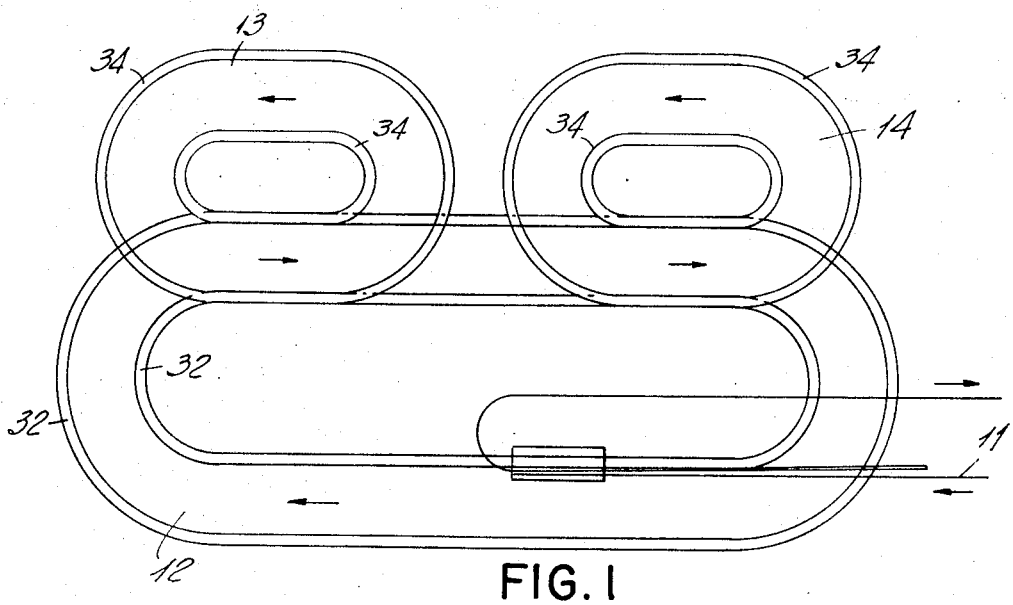
FIG. 1 is a plan view of the conveyor systems.

Turning now descriptively to the drawing, in which similar reference characters denote similar elements throughout the several views, FIG. 1 illustrates a conveyor system consisting of feeder conveyor 11, product conveyor 12, a first processing conveyor 13, and a second processing conveyor 14.

The speeds and directions of the various conveyors making up the system are synchronized so that in the areas of overlap of a pair of conveyors, both members of the pair are stationary relative to each other, although the conveyors are in continuous motion.

Each of the processing conveyors, 13 and 14 contain machinery and jigs for processing the product, such as drills, punches, and screw feeder machinery.

Figure 2:
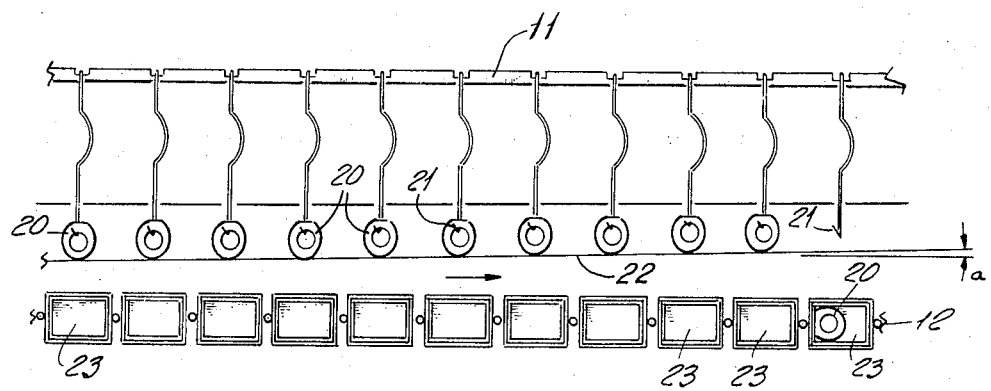
FIG. 2 is a side view of a feeder conveyor dropping the product onto the product conveyor.

The product 20, as shown in FIG. 2 may be initially hung from hooks 21 of feeder conveyor 23. The product 20 is lifted from hooks 21 by stationary lift bar 22 as the feeder conveyor carries the product 20 over the inclined angle "a" of stationary lift bar 22, so that the product 20 falls into an enclosed section 23 of product conveyor 12. The enclosed section 23 may be lined with an anti-abrasive coating or with soft material to prevent damage to the finish of the product 20, and may be fitted with locating jigs to hold the product in a fixed orientation.

Figure 3:
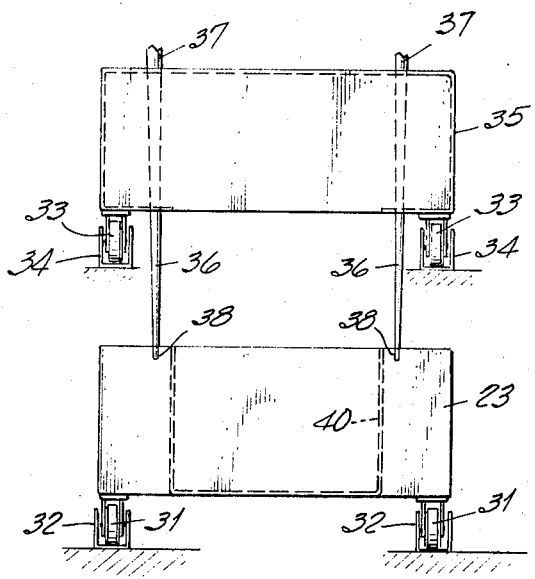
FIG. 3 is an end view of an overlapping section of conveyors where a processing conveyor rides parallel to and directly over the product conveyor.

FIG. 3 illustrates a section 35 of a processing conveyor 13 directly above a section 23 of the product conveyor 12. Product conveyor section 23 is mounted on rollers 31 which travel in track 32, while process conveyor section 35 is mounted on rollers 33 which travel in rails 34.

Accurate alignment of the process conveyor section 35 with the product conveyor section 23 is assured by dowel pins 36 which fit into alignment holes 38 in the process conveyor section 23. Prior to arriving at the area where the two conveyors separate, dowel pins 36 are withdrawn into tubes 37 in the process conveyor section 35.

The product is held in position in the product conveyor section 23 by means of frame 40.

It is to be noted that the preferred embodiment has been described in terms of the process conveyor riding above the product conveyor. Alternate embodiments of the apparatus include systems in which the product conveyor may ride over the process conveyor, or the two conveyors may ride along side of each other, as required.

Since obvious changes may be made in the specific embodiment of the invention described herein, it is indicated that all matter contained herein is intended as illustrative and not as limiting in scope.

Having thus described my invention, what I claim as new and desire to secure by Letters Patent of the United States is:

1. An automated conveyor apparatus for the processing of product on a moving conveyor by machinery, as the product is conveyed past the location of the machinery, in which the product is carried in motion on a continuous conveyor, with the machinery for processing the product carried in motion on a separate continuous conveyor, where a segment of the product carrying conveyor parallels and is adjacent to a segment of the machinery carrying conveyor, with both conveyors moving at the same speed and in the same direction at the location of the machinery conveyor such that machinery on the machinery carrying conveyor process the product being carried on the product carrying conveyor, while both conveyors are in motion.

2. The apparatus as described in claim 1 in which the machinery carrying conveyor rides above the product carrying conveyor at the location where both conveyors are in parallel relation.

3. The apparatus as described in claim 1 in which locking pins align a specific section of the machinery carrying conveyor with a specific section of the product carrying conveyor when said conveyor sections are in adjacent relation to each other.

4. The apparatus as described in claim 3 in which product to be processed is fed to the product carrying conveyor from a feeder conveyor, at a location where a segment of the feeder container is parallel to a segment of the product carrying conveyor.

5. The apparatus as described in claim 4 in which the product is hung from hooks on the feeder conveyor, with stationary means to lift the product off the said hooks, as the feeder conveyor carries the product past said means.

* * * * *